US008691935B2

(12) United States Patent
Harkabus et al.

(10) Patent No.: US 8,691,935 B2
(45) Date of Patent: Apr. 8, 2014

(54) METHODS AND MANUFACTURES RELATED TO ENCAPSULATION OF SILICA AEROGEL POWDER

(75) Inventors: Robert P. Harkabus, Austin, TX (US); Christopher M. Pavlos, Austin, TX (US); Keris A. Ward, Austin, TX (US)

(73) Assignee: Aeonclad Coatings, LLC, Austin, TX (US)

( * ) Notice: Subject to any disclaimer, the term of this patent is extended or adjusted under 35 U.S.C. 154(b) by 0 days.

(21) Appl. No.: 13/636,175

(22) PCT Filed: Mar. 23, 2011

(86) PCT No.: PCT/US2011/029644
§ 371 (c)(1),
(2), (4) Date: Sep. 20, 2012

(87) PCT Pub. No.: WO2011/119745
PCT Pub. Date: Sep. 29, 2011

(65) Prior Publication Data
US 2013/0012623 A1     Jan. 10, 2013

Related U.S. Application Data

(60) Provisional application No. 61/316,672, filed on Mar. 23, 2010.

(51) Int. Cl.
*C08G 63/06* (2006.01)
*C08G 63/66* (2006.01)

(52) U.S. Cl.
USPC .......................................................... 528/361

(58) Field of Classification Search
USPC .......................................................... 528/361
See application file for complete search history.

(56) References Cited

U.S. PATENT DOCUMENTS

| 5,876,753 A | 3/1999 | Timmons et al. |
| 6,365,638 B1 | 4/2002 | Schwertfeger et al. |
| 6,740,416 B1 | 5/2004 | Yokogawa et al. |
| 2008/0287561 A1 | 11/2008 | Menashi et al. |
| 2010/0204355 A1* | 8/2010 | Leventis et al. ............... 521/155 |
| 2010/0297248 A1 | 11/2010 | Timmons et al. |
| 2012/0128958 A1* | 5/2012 | Zeng et al. .................... 428/219 |

* cited by examiner

*Primary Examiner* — Terressa Boykin
(74) *Attorney, Agent, or Firm* — Mark E. Scott; Conley Rose, P.C.

(57) ABSTRACT

Encapsulation of silica aerogel powder. At least some of the illustrative embodiments are directed to methods including encapsulating silica aerogel powder. The encapsulating may include: providing the silica aerogel powder in a reaction chamber; supplying a monomer to the reaction chamber; creating an activated form of the monomer; and associating at least a portion the activated monomer with the silica aerogel powder.

26 Claims, 7 Drawing Sheets

METHODS AND MANUFACTURES RELATED TO ENCAPSULATION OF SILICA AEROGEL POWDER

CROSS-REFERENCE TO RELATED APPLICATIONS

None.

BACKGROUND

Silica aerogel powder is a man-made material comprising particles of silicon dioxide in a porous network. Aerogel powder is made from an aerogel solid. An aerogel solid is created by replacing the liquid of a gel-type solution with a gas, usually air. Aerogel has very low bulk density, is hydrophobic, and also has good thermal insulation properties. The thermal insulation and hydrophobic properties make aerogel-based products advantageous in uses such as outdoor harsh-weather apparel, as well as commercial and/or residential insulation.

However, to date use of aerogel-based products has been largely in bulk form (i.e., blocks or sheets of aerogel). The hydrophobic nature of aerogel means that aerogel does not disperse well in water-based solutions, and thus the hydrophobic nature limits potential uses. Further, aerogels do not adequately mix into polymer systems without significant use of surfactants. Moreover, aerogels have sensitivity to many solvents such that attempts to mix aerogel with particular solvents leads to destruction of the aerogel structure. The sensitivity to solvents further limits the uses of aerogel.

Thus, any advance which increased the solutions into which aerogel can be dispersed and/or mixed would provide a competitive advantage in the marketplace.

BRIEF DESCRIPTION OF THE DRAWINGS

For a detailed description of exemplary embodiments, reference will now be made to the accompanying drawings in which.

NOTATION AND NOMENCLATURE

Figure 1:
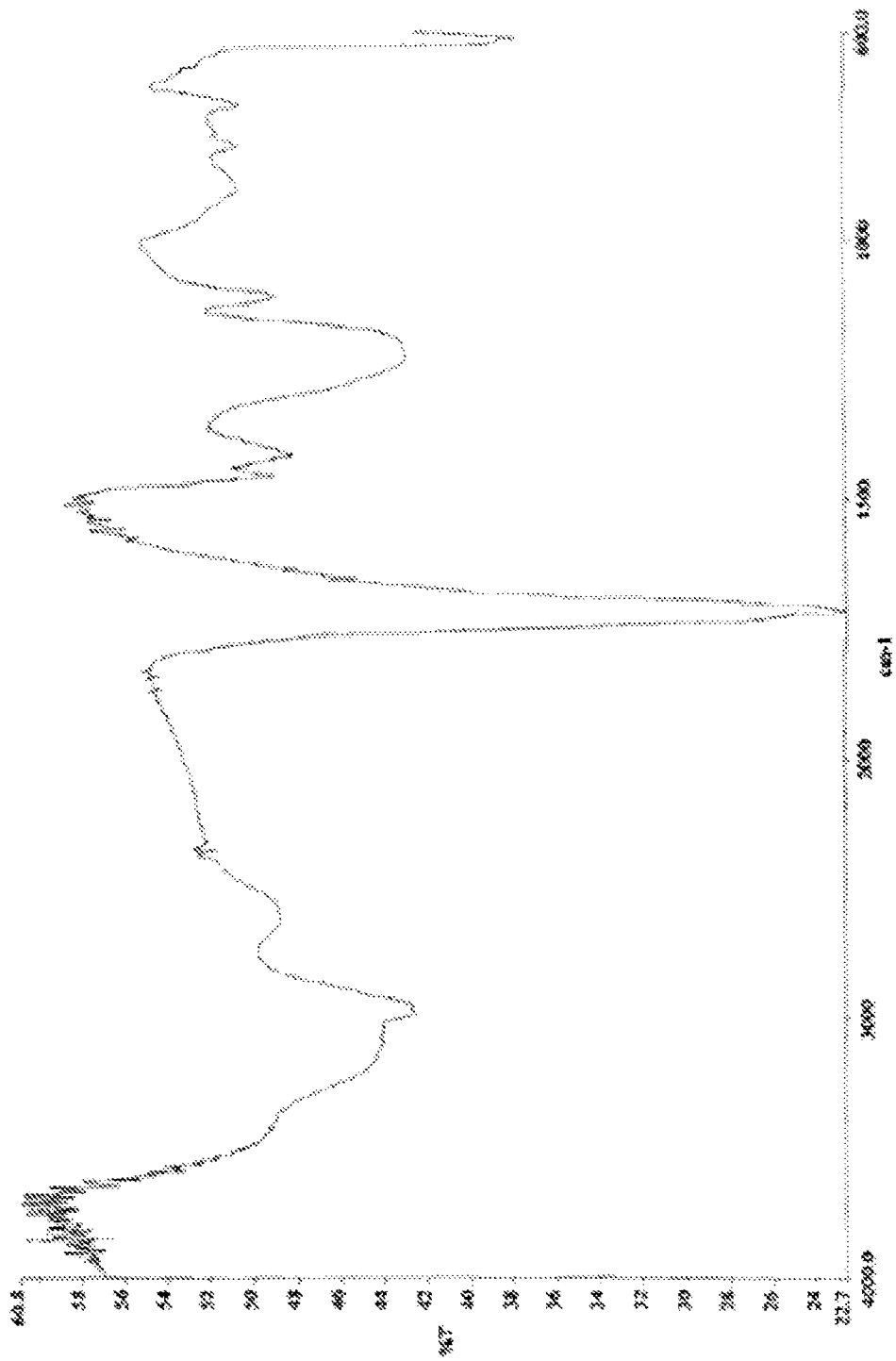
FIG. 1 shows a graph of an FTIR spectrum.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

Terms defined herein have meanings as understood by a person of ordinary skill in the areas relevant art. Terms such as "a", "an" and "the" are not intended to refer to only a singular entity, but include the general class of which a specific example may be used for illustration. The use of the word "a" or "an" when used in conjunction with the term "comprising" in the claims and/or the specification may mean "one," but it is also consistent with the meaning of "one or more," "at least one," and "one or more than one." Throughout this application, the term "about" is used to indicate that a value includes the inherent variation of error for the device, the method being employed to determine the value, or the variation that exists among the study subjects. The terminology herein is used to describe specific embodiments, but their usage does not delimit the scope, except as outlined in the claims.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to methods of encapsulating individual particles of silica aerogel powder, as well as encapsulated silica aerogel powder produced consistent with the methods. More particularly, the various embodiments are directed to a plasma enhanced chemical vapor deposition-based process of associating a monomer with particles of silica aerogel powder. The specification first turns to a high level description of illustrative methods of encapsulating the silica aerogel powder, and then provides examples.

In particular the illustrative method starts with a silica aerogel powder. Silica aerogel powder may be available from a variety of sources, such as NANOGEL® brand aerogel powder available from Cabot Corporation of Boston, Mass. The size of the particles in the silica aerogel powder may be different for each particular circumstance or application, but in many cases the particle sizes are 8 to 11 microns.

In accordance with the various embodiments, the silica aerogel powder is placed within a reaction chamber of a plasma enhanced chemical vapor deposition (PECVD) system. Any of a variety of reaction chamber configurations and volumes may be used. After placement of the silica aerogel powder within the reaction chamber, the air within the reaction chamber is evacuated. Several points are in order with respect to the initial evacuation of air from the reaction chamber. First, silica aerogel powders, particularly the very fine powders, tend to migrate with or be carried out of the reaction chamber with the air molecules. Thus, in some embodiments the rate of the initial air evacuation is controlled and is relatively slow. Moreover, a filter in some form may also be implemented to ensure silica aerogel powder remains within the reaction chamber. For example, wool plugs may be disposed within the tubing leading from the chamber to the vacuum source to reduce the number of the silica aerogel powder particles that are carried with the evacuating air. Silica aerogel powder has a very large surface area, on the order of 750 square meters per gram ($m^2/g$) prior to encapsulation, and thus the large surface area in combination with the relatively slow air evacuation rate may lead to extended periods of exposure to vacuum to de-gas the reaction chamber containing the silica aerogel powder. In a particular embodiment, the evacuation of the reaction chamber is continued until the chamber reaches a base pressure (e.g., about 0 to 3 milli-Torr (mTorr)).

In order to reduce the amount of silica aerogel powder carried away during the initial evacuation, the reaction chamber and/or the silica aerogel powder may be held relatively still. Stated otherwise, in some embodiments, during the initial evacuation, neither the reaction chamber nor the silica aerogel powder are exposed to physical agitation. In such cases, the silica aerogel may tend to settle in the lower portions of the reaction chamber, which may tend to trap air molecules and thus extend the amount of time used to evacuate the chamber. In other embodiments, the reaction chamber and/or the silica aerogel powder may be exposed to physical agitation during the initial evacuation, particularly as the pressure within the reaction chamber approaches the base pressure and thus the likelihood of silica aerogel powder particles being carried upon the exiting air molecules is reduced.

Once the reaction chamber is deemed to be under sufficient vacuum and/or out-gassing of the silica aerogel powder has completed, the silica aerogel powder may be subjected to a "cleaning" process. More particularly, in at least some embodiments an inert gas is fed to the reaction chamber, and radio frequency (RF) energy is supplied to the chamber such that plasma is created within the reaction chamber. In a particular embodiment, the inert gas is argon, but other inert gases, as well as mixtures containing inert gases, may be equivalently used. The flow rate of the inert gas will be dependent upon the volume of the reaction chamber and the rate at which gas is removed by the vacuum source. The pressure within the reaction chamber during periods of time when inert gas is being provided will be above the base pressure achievable within the reaction chamber, but will be below atmospheric pressure. In some embodiments the pressure will be below 1500 mTorr and above 1 mTorr, in a particular embodiment between 100 mTorr and 300 mTorr, and in yet another embodiment between 150 mTorr and 250 mTorr. Other pressures may be equivalently used.

The frequency of the RF energy applied to the reaction chamber is 13.56 Mega-Hertz (MHz) in accordance with a particular embodiment, but other frequencies may be equivalently used. The RF energy may be applied to the reaction chamber by way of one or more metallic cathodes in operational relationship to one or more metallic anodes. The amount of power provided to the reaction chamber is a function of the volume of the reaction chamber. In a particular embodiment between 1 and 300 Watts of power are provided, and in yet still other cases between 150 and 250 Watts of power are provided. When insufficient power is provided to the reaction chamber by the RF energy, formation of plasma may not occur, the plasma may be sporadic. Excessive power may damage the silica aerogel powder particle structure.

In a particular embodiment, the power provided to the reaction chamber during the cleaning process is continuous (i.e., 100% duty cycle). However, in other cases the power provided during the cleaning process may be pulsed with a particular duty cycle. For example, if for a given period of time power is provided for half the period, and not provided for half the period, the duty cycle is said to be 50%. As yet another example, if the for a given period of time the power is provided for ⅓ of the period, and not provided for ⅔ of the period, the duty cycle is said to 33⅓%. Suitable on/off times are in the millisecond range for cases where less than 100% duty cycle is used in the cleaning process, although shorter durations are also sometimes used.

Though the inventors do not wish to be tied to any particular physical explanation of the cleaning process, it is believed that the during periods of time when the silica aerogel powder is exposed to the plasma in the presence of inert gas, the exterior surface of each particles of the silica aerogel powder is slightly removed or etched. For example, some silica aerogel powder has methyl groups ($CH_3$) attached to the outer surfaces, and the cleaning process may remove some methyl groups, thus leaving bonding locations for the encapsulation process (discussed more below). Other physical explanations for the cleaning process may be equally valid, and thus the theory shall not be read as a limitation as to the applicability of the various embodiments.

It is noted that the cleaning process described above is not necessarily a required process for the encapsulation. Indeed, silica aerogel powder may be encapsulated as discussed below with the cleaning process omitted in some embodiments.

The next step in the illustrative process may be one or more deposition phases in which the silica aerogel powder is fully or partially encapsulated. In particular, with the silica aerogel powder within the reaction chamber, a monomer is supplied to the reaction chamber. There is a diverse range of monomers with retained functional groups which may be bound to aerogels to achieve the desired properties. Examples of monomer suitable for use in the present disclosure include but are not limited to carboxylic acids, carboxylates, amines, alcohols, thiols, acid chlorides, halides, epoxides, isocyanates, anhydrides, fluorocarbons, silanes, alkyls, alkenes, aromatics, ethers, esters, and amides. However, any low molecular weight monomer, containing these or other functional groups, can be polymerized which will result in controlled retention of the functional groups present on the monomers.

The flow rate of the monomer will be dependent upon the volume of the reaction chamber and the rate at which gas is removed by the vacuum source. The pressure within the reaction chamber during periods of time when the monomer is being provided will be above the base pressure achievable within the reaction chamber, but will below atmospheric pressure. In some embodiments the pressure will be below 1500 mTorr and above 1 mTorr, in a particular embodiment between 100 mTorr and 300 mTorr, and in yet another embodiment between 150 mTorr and 250 mTorr. Other pressures may be equivalently used.

During periods of time when the monomer is being supplied to the reaction chamber, an activated form of the monomer is created within the reaction chamber. Activation of the monomer within the reaction chamber may take any suitable form, such activation by plasma. In the illustrative case of activation by plasma creation, RF energy is supplied to the reaction chamber such that plasma is created within the reaction chamber. In some embodiments the same physical equipment used to supply RF energy to the reaction chamber during the cleaning process may likewise be used to supply RF energy to the reaction chamber to activate the monomer. Thus, in a particular embodiment the frequency of the RF energy applied to the reaction chamber to activate the monomer is 13.56 MHz, but other frequencies, including frequencies different than the frequency used during the cleaning process, may be equivalently used. The RF energy may be supplied to the reaction chamber by the same electrodes used to create the plasma during the cleaning process, or different electrodes may be used. The amount of power provided to the reaction chamber is directly proportional to the volume of the reaction chamber. In a particular embodiment the power provided to the reaction chamber is between 1 and 300 Watts, in yet other embodiments is between 150 and 250 Watts. Other power settings may be equivalently used.

In a particular embodiment, the power provided to the reaction chamber during at least one deposition phase is continuous (i.e., 100% duty cycle). However, in other embodiments the power provided during the one or more deposition phases may be pulsed with a particular duty cycle. For example, early depositional phases may use continuous duty cycle RF energy (i.e., 100% duty cycle), or early depositional phases may use higher duty cycles (e.g., above 50% duty cycle). Later depositional phases may use lower duty cycles (e.g. 50% or less duty cycle, 34% or less duty cycle). The plasma created based on the RF energy activates some or all the monomer, which thus enables associating of the activated monomer with the particles of the silica aerogel powder.

The associating of the activated monomers with the particles of the silica aerogel powder may have a variety of forms. For example, activated monomers may associate with the silica aerogel powder by electrostatic interaction, absorption, adherence, by chemical bonding (e.g., covalent bonds), or a combination. Thus, the terms "associating" and "association", as well as the related term "depositing", do not necessarily imply a particular type of interaction between particles of the silica aerogel powder and the activated monomers. Moreover, the association of the activated monomers with silica aerogel powder may be a surface-only association, or the association may result in portions or all of a monomer extending below what may be considered the "surface" of a particle of silica aerogel powder.

As discussed above, the silica aerogel powder tends to settle to the lower portions of the reaction chamber under force of gravity. However, in settling the silica aerogel powder may be unevenly exposed to the activated monomer. Thus, in an embodiment the reaction chamber and/or the silica aerogel powder is exposed to mechanical agitation during at least some periods of time when the activated monomer is associating with the silica aerogel powder. Mechanical agitation may take any suitable form. For example, in one embodiment a rotatable reaction chamber with internal baffles may be employed to provide the mechanical agitation and thus to help achieve encapsulation of particles. Other mechanical agitation methods may comprise a mill, fixed bed, flat hearth, fluidized bed, vibration bed, spouted bed, circulating fluidized bed, or a drop tower reaction configuration.

As mentioned above, the particles of silica aerogel powder have significant surface area per unit volume. Thus, extended periods of time within the depositional phases may be needed to ensure for encapsulation of the particles. The precise amount of time may be dependent upon a variety of factors, such as amount of silica aerogel powder within the reaction chamber, particle size of the silica aerogel powder, and activated monomer density within the reaction chamber. In some embodiments, the period of time spent in each depositional phase will be more than 30 minutes, in a particular embodiment more than 90 minutes, and in yet another embodiment between 90 and 120 minutes. Other time periods may be equivalently used.

The association of the activated monomer with the silica aerogel powder results in an encapsulation of some or all the particles of the silica aerogel powder. In an embodiment, the activated monomer is present in sufficient quantity and for a sufficient time to enable coverage from about 1% to about 100% of the surface area of each particle of the silica aerogel powder. Alternatively the activated monomer covers greater than about 5, 10, 15, 20, 25, 30, 35, 40, 45, 50, 55, 60, 65, 70, 75, 80, 85, 90, or 95% of the surface area of an individual particle of the silica aerogel powder.

The inventors of the present specification have found that an amount of cross-linking between monomers associated with the silica aerogel powder is controlled at least in part by the total RF energy supplied to the reaction chamber during association of the activated monomer with the particles of the silica aerogel powder. That is, for example, duty cycle of the applied RF energy (and therefore duty cycle of the plasma), applied voltage, peak power, and/or average power, alone or in combination, play a role in an amount of cross-linking between the monomers. In accordance with at least some embodiments, earlier deposition stages use higher RF energy, in some cases continuous RF energy. In such situations, the activated monomers not only associate with the particles of the silica aerogel powder, but also cross-link with each other. In some cases, cross-linking results in a highly cross-linked carbon film that retains little or no functionality of the reactive monomer. By contrast, lower total RF energy results in less cross-linking between the monomers associated with the silica aerogel powder, and thus more functionality of the monomer is retained.

Thus, in some embodiments the chemical composition or chemical character of the encapsulant deposited in the reaction chamber varies along the thickness—a gradiated encapsulation. In the illustrative case of using higher RF energies in early depositional phases, and lower RF energies in later depositional phases, the encapsulant varies between low reactivity at the innermost layers (i.e., low reactivity of the highly cross-linked carbon film) to greater reactivity at the outer layers where the encapsulant retains many functionalities of the monomer.

Depending on the monomer selected, the encapsulation discussed above results in many advantageous properties. For example, in a particular embodiment the hydrophobic nature of silica aerogel powder may be changed to hydrophilic such that the silica aerogel powder may be dispersed in water-based substances (e.g., water-based paints). In a specific example, by using a monomer in the form of acrylic acid during one more deposition phases discussed above, the encapsulated silica aerogel powder becomes hydrophilic, in some cases without necessitating the use of surfactants. Moreover, such encapsulation protects the underlying particles of silica aerogel powder such that dispersion in solvents that would otherwise break down the silica aerogel powder is possible. More particularly, the encapsulant may prevent intrusion of small molecules or polymers into pores of the particles of the silica aerogel powder.

Further still, the ability to encapsulate the particles of the silica aerogel powder enables further encapsulations and thus further functionality. For example, based on the functionality of first encapsulant, a second encapsulant may be applied (e.g., where the second encapsulant either would not associate with the silica aerogel powder, or would act as solvent to break down the structure of the silica aerogel powder). The second encapsulant may provide further functionality. Consider, as an example, applying an ultraviolet energy-cured ethylene glycol encapsulant over the illustrative acrylic acid-based encapsulant. Such a second coating prevents the intrusion of small molecules and polymers into the porous silica aerogel, and further enables dispersion in other substances, such as dispersion in polymer-based substances (i.e., increases lipophilicity). In some cases, either the first or second encapsulant may enable dispersion into solvents without necessitating the use of surfactants.

In many embodiments, the underlying physical characteristics of the silica aerogel powder remain unchanged, or substantially unchanged, in spite of the encapsulation. For example, in a particular embodiment the silica aerogel powder retains at least 50% of the pretreated surface area in spite of the encapsulation. In yet still other embodiments, the silica aerogel powder retains at least 88% of its pre-treated surface area. The specification now turns to example where silica aerogel powder was successfully encapsulated.

EXAMPLE 1

Functionalization of Silica Aerogel Powder Using Acrylic Acid ($C_3H_4O_2$) as the Monomer In this example, the reaction chamber was a rotational-type reaction chamber constructed of glass, having internal baffles, and defining a reaction chamber volume of about 1.0 Liter. About 0.5 grams of NANOGEL® (TLD201) brand silica aerogel powder was introduced into the reaction chamber. In order to reduce the amount of silica aerogel powder carried away during initial evacuation of the air, as well as to reduce loss of silica aerogel powder during the depositional phases, each end of the chamber was fitted with wool plugs.

The first step or phase was a cleaning phase. Pressure within the reaction chamber was held at about 200 mTorr as argon gas was flowed into the chamber at a rate of about 100 standard cubic centimeters per minute (scc/min). The reaction chamber was rotated during the cleaning phase at approximately 15 revolutions per minute (rpm). RF energy at a frequency of about 13.56 MHz was supplied by way of an anode electrode and cathode electrode outside the reaction chamber but each disposed proximate to the reaction chamber. The power supplied during the cleaning phase was about 200 Watts, and the power was supplied continuously (i.e., 100% duty cycle). The run time for the cleaning phase was about 30 min.

The second step or phase in this example was a first of two depositional phases. Pressure within the reaction chamber was held at about 180 mTorr as acrylic acid was introduced into the chamber at a rate in the range of 5-100 scc/min. The reaction chamber was rotated during the cleaning phase at 15 rpm. RF energy at a frequency of about 13.56 MHz was supplied by way of the same electrodes as used in the cleaning phase. The power supplied during the first depositional phase was about 160 Watts, and the power was supplied with a duty cycle of about 25% comprising 10 milli-second (ms) on time and 30 ms off time. The run time for the first depositional phase was about 90 min. It is noted that in other attempts, an initial deposition phase run time of about 45 minutes produced unsatisfactory results.

The third step or phase in this example was a second depositional phase. Pressure within the reaction chamber was again held at about 180 mTorr as acrylic acid was introduce into the chamber at a rate of about 5-100 scc/min. The reaction chamber was rotated during the cleaning phase at 15 rpm. RF energy at a frequency of about 13.56 MHz was supplied by way of the same electrodes as used in the cleaning phase. The power supplied during the second depositional phase was about 160 Watts, and the power was supplied with a duty cycle of about 14% comprising 5 ms on time and 30 ms off time. The run time for the second depositional phase was about 120 min. It is noted that in other attempts, a second depositional phase run time of about 60 minutes (in combination with the about 45 minute first depositional phase) produced unsatisfactory results.

Figure 7:
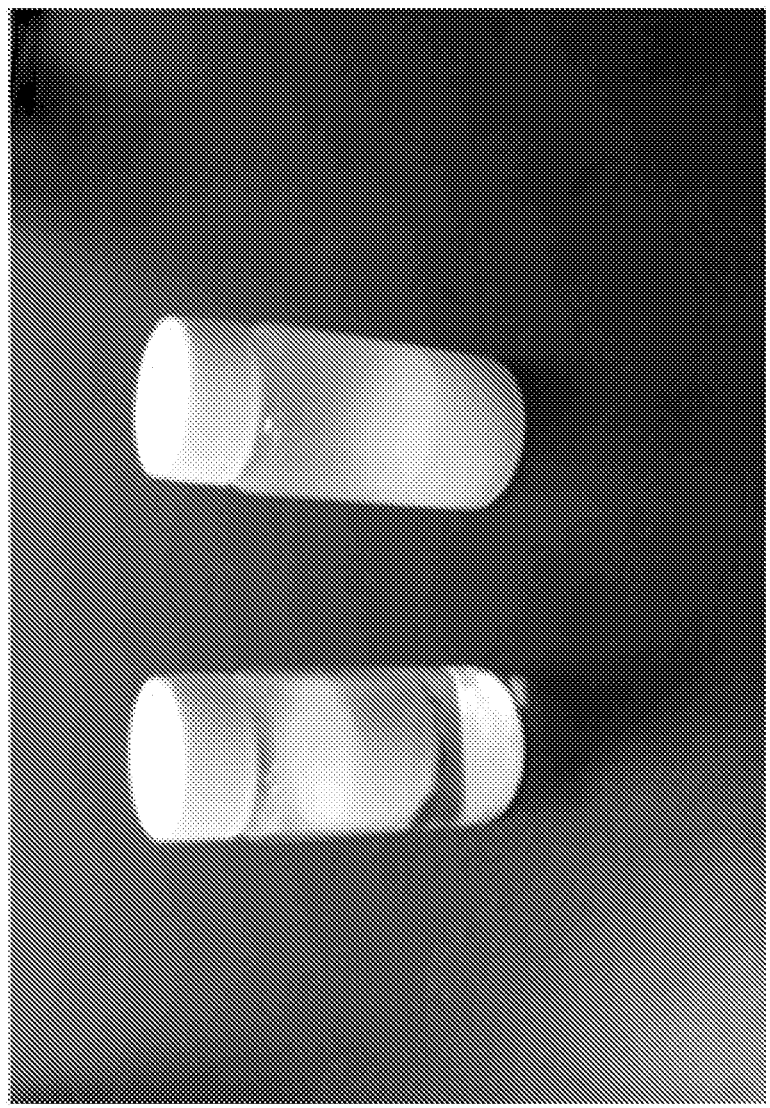
FIG. 7 shows a left vial of untreated nanogel compared to a right vial of treated aerogel, both in the presence of de-ionized water.

The silica aerogel powder encapsulated using the steps of Example 1 was placed in a clear vial containing deionized water. With slight agitation, dispersion was easily seen, indicating a change to a hydrophilic nature of the encapsulated silica aerogel powder. The comparison of encapsulated silica aerogel powder to non-encapsulated silica aerogel powder is shown in FIG. 7.

EXAMPLE 2

Functionalization of Silica Aerogel Powder Using Acrylic Acid ($C_3H_4O_2$) as the Monomer Aerogel powder (0.1-1.0 grams (g)) was introduced into the reaction chamber and vacuum is drawn down to a base pressure of 0-3 mTorr. Argon gas was introduced into the chamber at a flow rate of 100 scc/min. A throttle valve wired to a pressure controller and transducer was utilized to achieve a constant pressure between 1-1500 mTorr. RF energy at 13.56 MHz was discharged between two parallel plate electrodes residing on opposite sides of the plasma chamber on a continuous basis (i.e., 100% duty cycle). The signal amplitude was adjusted to achieve a power of between 1-300 Watts. Rotation of the chamber during processing enables agitation and exposure to plasma of the individual particles. The argon plasma was maintained for 30 minutes at which point the RF energy was turned off, the argon flow was shut off, and the system evacuated to base pressure. Acrylic acid was then introduced into the reaction chamber through a direct feed port and the system pressure set to between 1-1500 mTorr. The RF power was turned on and the plasma ignited at a peak power of between 1-300 W. A pulsing method for the RF energy enabled for a lower overall average energy than continuous wave processes. During the first deposition step or phase, the pulse rate was set to 10 ms on, 30 ms off (10/30). After 90 minutes of deposition, the pulse rate was changed to 5 ms on, 30 ms off (5/30). After 120 minutes of deposition at the 5/30 pulse rate, the RF energy was turned off, the acrylic acid flow was shut off, and the reaction chamber evacuated. The processed aerogel was then removed from the chamber and used as described below.

Silicon wafers have been subjected to plasma deposition of acrylic acid in order to analyze the resultant chemistry. This technique enables obtainment of an Fourier Transform Infrared (FTIR) spectrum of the deposited film, as well as measurement of water contact angle and film deposition rate. A FTIR spectrum for an acrylic acid deposition consistent with Examiner 2 is shown in FIG. 1. Films are deposited at an average rate of 7 nanometers per minute (nm/min) and yield water contact angles of 15-45 degrees.

SEM Imaging of Plasma Coated Silica Aerogel Powder

Figure 2:
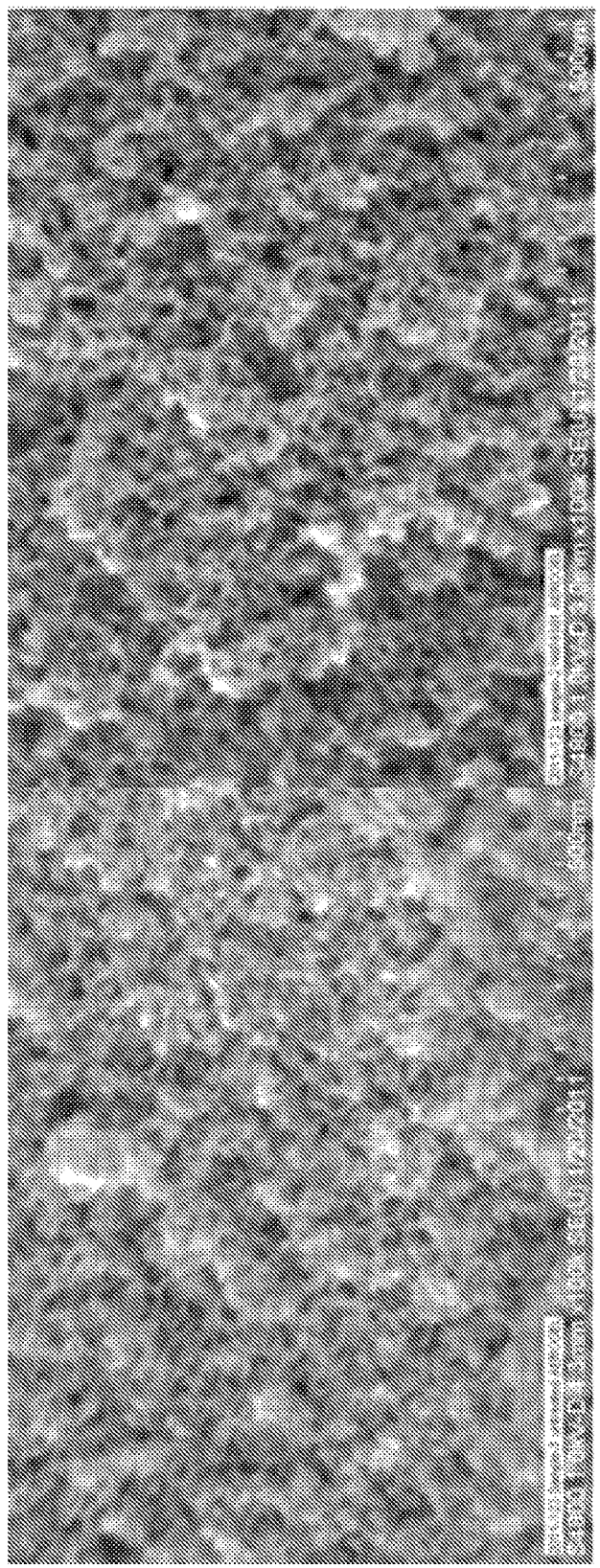
FIG. 2 shows view produced by a SEM.

The physical structure of the plasma coated aerogel powder of Example 2 was compared to untreated silica aerogel powder by Scanning Electron Microscopy (SEM). The results are shown in FIG. 2. The physical properties of the underlying silica aerogel powder remain substantially unchanged in spite of the encapsulation. In particular, the left image of FIG. 2 shows a portion of a particle of untreated silica aerogel powder, and the right portion of a particle of treated silica aerogel powder. Note the fine, porous structure after plasma treatment. As evidenced in FIG. 2, the plasma coating process did not damage the structure of the aerogel.

EDX-SEM Imaging of Plasma Coated Silica Aerogel Powder

Energy-Dispersive X-ray (EDX) Spectroscopy was utilized to identify the atoms present in the plasma processed silica aerogel powder samples treated consistent with Example 2. When compared to untreated silica aerogel powder and normalized to the silicon peak, the EDX spectra of all plasma-processed silica aerogel powder samples showed a higher carbon and oxygen content, indicating polymeric deposition on the silica aerogel powder surface.

EXAMPLE 3

Preparation of PEG-Encapsulated Aerogel

In order to develop a solvent resistant silica aerogel powder, the inventors of the present specification developed methods for encapsulating the acrylic acid functionalized silica aerogel powder in a highly crosslinked poly(ethyleneglycol) polymer shell (i.e., PEG-encapsulated silica aerogel powder). A waterborne UV polymerization method was utilized. A reaction vessel was charged with 30 milli-liters (ml) of deionized water. Plasma coated silica aerogel powder from Example 2 (about 0.25 g) was added. After thorough mixing, 0.9 ml of a 5 mM aqueous solution of 4-benzoyl benzylamine hydrochloride (Matrix Scientific), 0.5 mL of a 1% (wt.) aqueous solution of N,N'-methylenebis(acrylamide) (Sigma-Aldrich), and 1 g polyethylene glycol 200 diacrylate (Sartomer) were added to the reaction vessel. The contents of the reaction vessel were rigorously stirred to ensure all soluble components were dissolved. The reaction vessel was exposed to broadband UV light while stirring for 2 hours. Complete encapsulation of the silica aerogel powder was evidenced by settling of the powdered product after the reaction was complete (prior to encapsulation, silica aerogel powder rises to the top of the reaction vessel due to the extremely low density). The resulting precipitant was filtered with a Buchner funnel and subsequently dried in an oven at 60° C. The dried powder was ground to less than 50 µm size, and tested for surface area by the BET method (discussed below).

SEM Imaging of PEG-Encapsulated Aerogel

Figure 3:
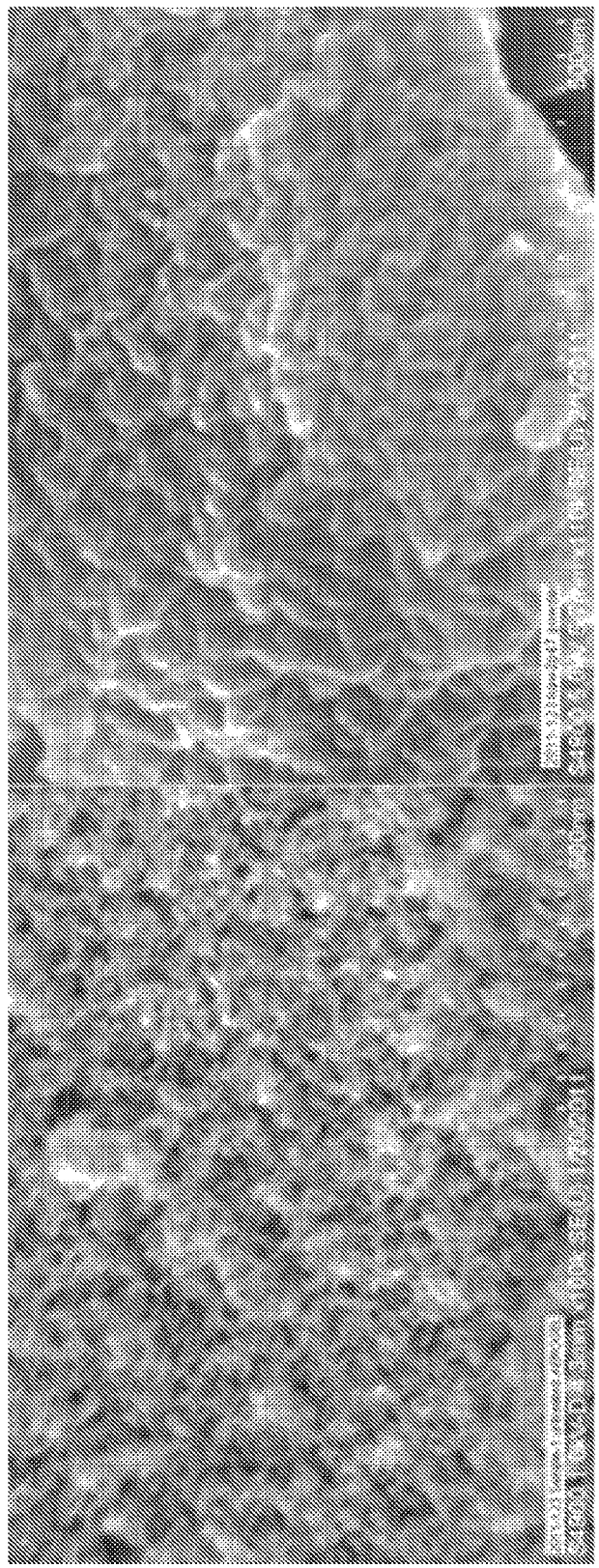
FIG. 3 shows a view produced by a SEM.

The structure of the encapsulated silica aerogel powder of Example 3 was compared to untreated silica aerogel powder by Scanning Electron Microscopy. The results are shown in FIG. 3. The encapsulating polymer forms a shell around the silica aerogel powder as opposed to coating into the pores. In particular, the left image of FIG. 3 shows a portion of a particle of untreated silica aerogel powder, and the right image shows a portion of a particle of silica aerogel powder being polymer encapsulated. Note that the PEG polymer completely encapsulates the silica aerogel powder particle thus enclosing the highly pourous structure in this example.

Surface Area Analysis

As mentioned above, silica aerogel powder has a high surface area per unit volume. If any coating process (e.g., plasma coating or PEG-encapsulation) was to cover over the aerogel pores, an extreme decrease in surface area should be observed. To monitor for such an effect, surface area analysis (BET) was performed on both plasma coated and PEG-encapsulated silica aerogel powder for comparison to untreated aerogel powder. The results of the analysis are given in Table 1 below.

TABLE 1

| Sample | Surface Area ($m^2/g$) |
| --- | --- |
| Untreated Aerogel (TLD201, Cabot) | 732 |
| Plasma Deposition of Acrylic Acid on Aerogel | 646 |
| PEG-Encapsulated Aerogel | 7 |

In particular, Table 1 shows surface area in square meters per gram ($m^2/g$) of untreated silica aerogel powder, silica aerogel powder plasma treated using acrylic acid as the monomer, and plasma treated silica aerogel powder after PEG encapsulation.

As evidenced by the data, the plasma deposition process results in an extremely conformal coating that penetrates deep into the silica aerogel powder pores and only slightly decreases the aerogel surface area. In stark contrast, the PEG-encapsulation method substantially covers pores resulting in a significant decrease in surface area.

EXAMPLE 4

Preparation of Epoxy Composite Containing Plasma Coated Silica Aerogel Powder

Acrylic acid coated silica aerogel powder from Example 2 was incorporated into an epoxy composite. Epoxy resin (9.4 g, EPON 828) was mixed thoroughly with a curing agent (12.0 g, Jeffamine D230) and allowed to react for 48 hours at room temperature resulting in a highly viscous liquid. Plasma treated silica aerogel powder from Example 2 (1.0 g) was stirred in to make a thick, homogeneous paste. Additional epoxy resin (28.2 g, EPON 828) was added and the entire mixture was stirred until completely homogeneous. The material was thoroughly degassed under vacuum, cast into a mold, and allowed to fully cure for 72 hours at room temperature. The resulting composite material contained 2% aerogel powder by weight.

SEM Imaging of Aerogel/Epoxy Composite Cross Section

Figure 4:
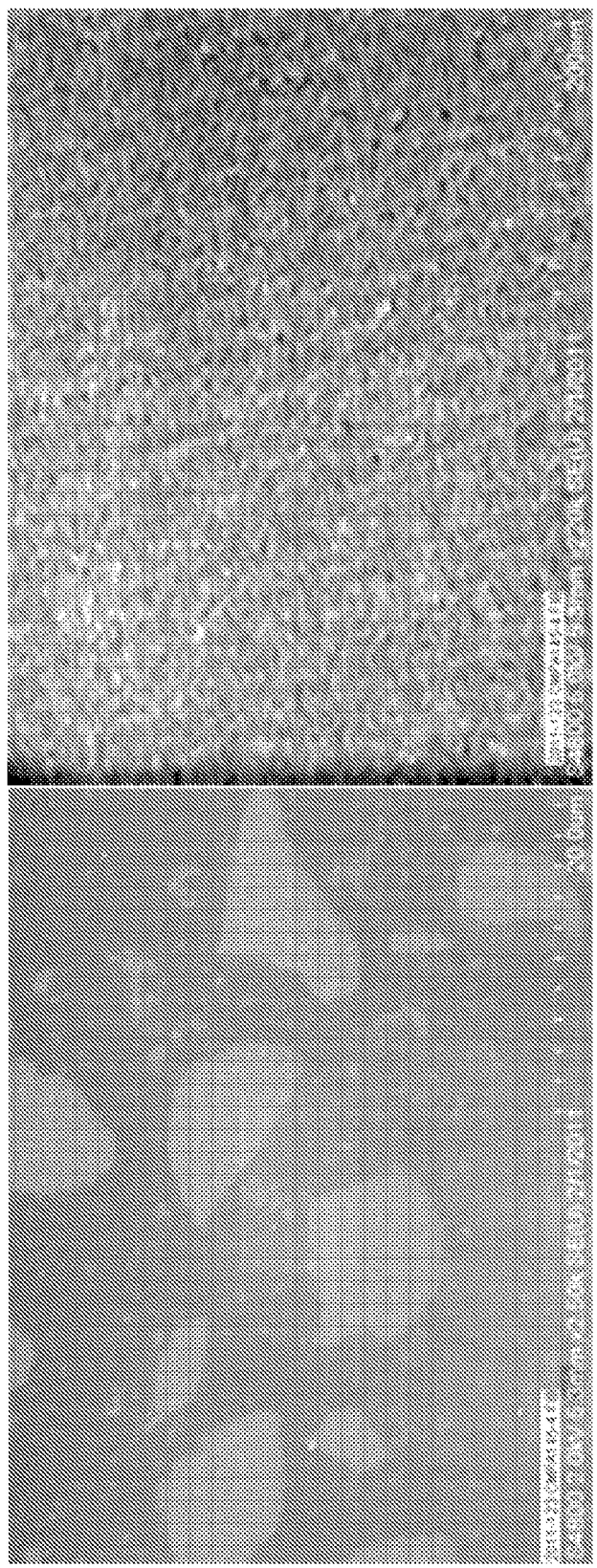
FIG. 4 shows a view produced by a SEM.

Focused Ion Beam was used to polish a cross section of the aerogel/epoxy composite material from Example 4. SEM imaging was utilized to observe the presence of aerogel particles in the epoxy resin. The results are shown in FIG. 4. As shown, intact, discreet particles of silica aerogel powder exist within the composite matrix. In particular, the left portion of the FIG. 4 shows discrete particles of silica aerogel powder of primary particle size (8-11 microns) throughout. The right portion of FIG. 4, at higher magnification, shows an image of silica aerogel powder cross section revealing the intact porous structure. Note that the focused ion beam caused a relatively flat surface as compared to bulk silica aerogel powder.

SEM Imaging of Aerogel/Epoxy Composite Cross Section

Figure 5:
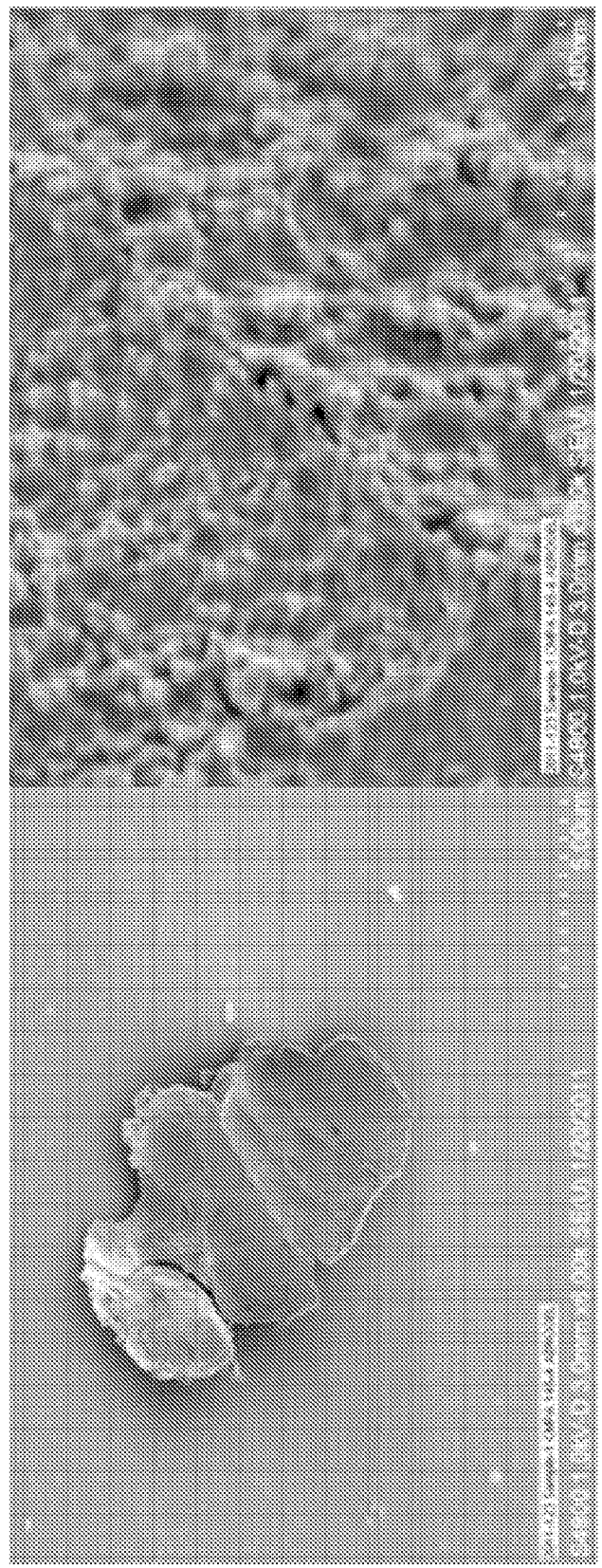
FIG. 5 shows a view produced by a SEM.

A cross section of the aerogel/epoxy composite material from Example 4 was prepared and polished mechanically. SEM imaging was utilized to observe the presence of aerogel particles in the epoxy resin. The results are shown in FIG. 5. As shown, intact, discreet aerogel particles exist within the composite matrix. In particular, the left portion of FIG. 5 shows a discreet particle of silica aerogel powder within the composite matrix (the particle size about 8-11 microns). The right portion of FIG. 5, at higher magnification, shows a cross section of the structure of a particle of silica aerogel powder, revealing the intact porous structure.

SEM Imaging of PEG-Encapsulated Aerogel/Epoxy Composite Cross-Section

Figure 6:
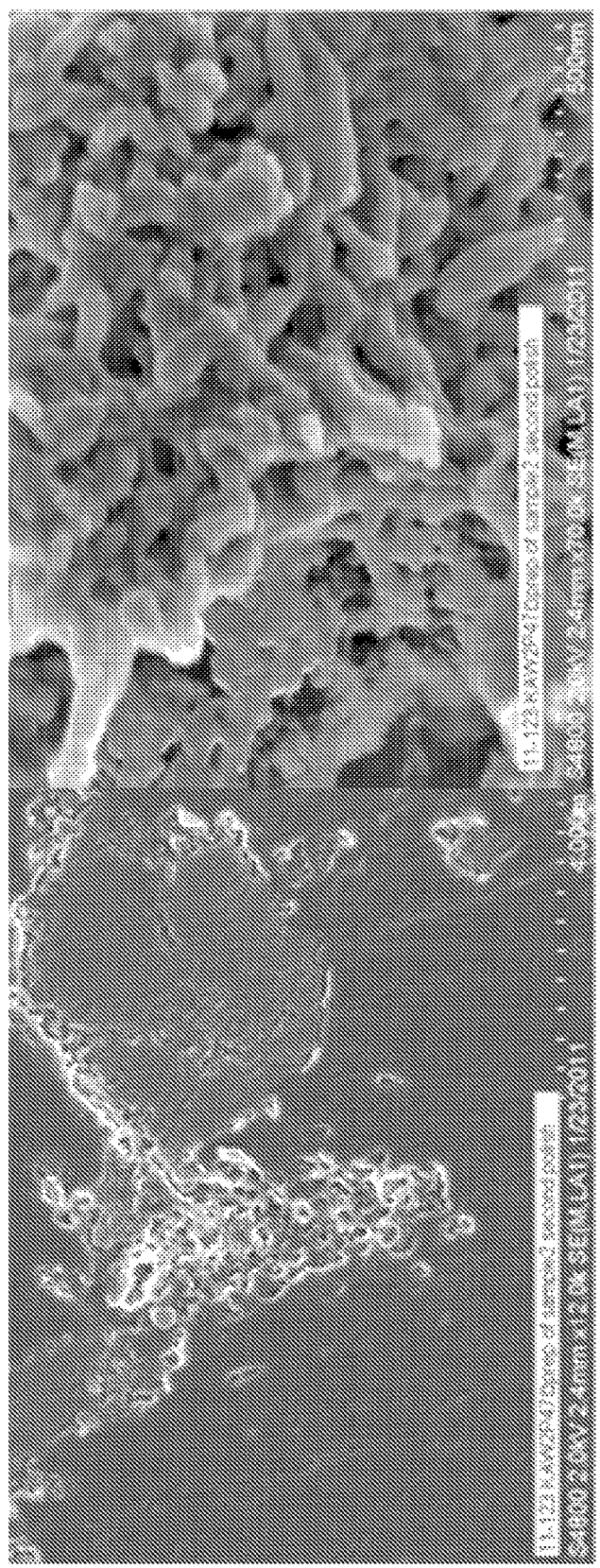
FIG. 6 shows a view produced by a SEM.

A cross section of the aerogel/epoxy composite material from Example 4 was prepared and polished mechanically. SEM imaging was utilized to observe the presence of aerogel particles in the epoxy resin. The results are shown in FIG. 6. As shown, intact, discreet aerogel particles exist within the composite matrix. In particular, the left portion of FIG. 6 shows discreet particles of silica aerogel powder in the composite matrix (the particle size about 8-11 microns). The right portion of FIG. 6, at higher magnification, shows a cross section of the structure of a particle of silica aerogel powder, revealing the intact porous structure.

EXAMPLE 5

Preparation of Epoxy Composite Containing Plasma Coated Silica Aerogel Powder

Acrylic acid coated silica aerogel powder from Example 2 was incorporated into an epoxy composite. Epoxy resin (37.6 g, EPON 828) was mixed thoroughly with a curing agent (12.0 g, Jeffamine D230). Plasma treated silica aerogel powder from Example 2 (1.0 g) was stirred in to make a viscous liquid. The mixture was stirred until completely homogeneous. The material was thoroughly degassed under vacuum, cast into a mold, and allowed to fully cure for 72 hours at room temperature. The resulting composite material contained 2% aerogel powder by weight.

EXAMPLE 6

Preparation of Epoxy Composite Containing PEG-Encapsulated Silica Aerogel Powder PEG-encapsulated silica aerogel powder from Example 3 was incorporated into an epoxy composite. Epoxy resin (6.3 g, EPON 828) was mixed thoroughly with a curing agent (2.1 g, Jeffamine D230). PEG-encapsulated aerogel from Example 3 (1.6 g) was stirred in to make a viscous liquid. The mixture was stirred until completely homogeneous. The material was thoroughly degassed under vacuum, cast into a mold, and allowed to fully cure for 72 hours at room temperature. The resulting composite material contained approximately 4% aerogel powder by weight The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A method comprising:
encapsulating silica aerogel powder comprising:
providing the silica aerogel powder in a reaction chamber;
supplying a monomer to the reaction chamber;
creating an activated form of the monomer by way of a plasma within the reaction chamber; and
associating at least a portion of the activated monomer with the silica aerogel power.
2. The method of claim 1 further comprising, prior to supplying or creating the activated form of the monomer:
supplying an inert gas to the reaction chamber; and
creating a plasma within the reaction chamber while supplying the inert gas.

3. The method of claim 1 wherein activating further comprises activating by way of a pulsed-plasma within the reaction chamber.
4. The method of claim 3 wherein the activating further comprises activating by the pulsed-plasma with a duty cycle of 50% or less.
5. The method of claim 4 wherein activating further comprises activating by the pulsed plasma having a duty cycle of 34% or less.
6. The method of claim 1 wherein the silica aerogel powder retains at least some of its pretreated physical properties.
7. The method of claim 6 wherein the silica aerogel powder retains at least 50% of its pretreated surface area.
8. The method of claim 6 wherein the silica aerogel powder retains at least 88% of its pretreated surface area.
9. The method of claim 3 further comprising, during the associating, mechanically agitating the silica aerogel powder.
10. The method of claim 9 wherein mechanically agitating further comprises at least one selected from the group consisting of: milling the silica aerogel powder; fluidizing the silica aerogel powder; rotating the silica aerogel powder; tumbling the silica aerogel powder; vibrating the silica aerogel powder; circulating the silica aerogel powder; and dropping the silica aerogel powder through the reaction zone.
11. The method of claim 1 wherein supplying the monomer further comprises supplying at least one monomer comprising a functional group selected from the functional groups consisting of: carboxylic acids; carboxylates; amines; alcohols; thiols; acid chlorides; halides; epoxides; isocyanates; anhydrides; fluorocarbons; silanes; alkyls; alkenes; aromatics; ethers; esters; and amides.
12. The method of claim 1 further comprising cross-linking at least a portion of the plurality of monomers associated with the silica aerogel powder.
13. A manufacture comprising a silica aerogel powder with at least a portion of each particle encapsulated by a first polymer, and wherein the first polymer is formed from a plasma-activated monomer.
14. The manufacture of claim 13 wherein the first polymer contributes to a hydrophilic character of the silica aerogel.
15. The manufacture of claim 13 wherein the first polymer contributes to the silica aerogel powder being dispersable in an aqueous solution without necessitating the use of surfactants.
16. The manufacture of claim 13 wherein the first polymer contributes to the silica aerogel powder being dispersable in a polymer compound without necessitating the use of surfactants.
17. The manufacture of claim 13 wherein the first polymer varies in chemical composition along the thickness.
18. The manufacture of claim 13 wherein first polymer is polymerized from at least one monomer selected from the group consisting of: carboxylic acids; carboxylates; amines; alcohols; thiols; acid chlorides; halides; epoxides; isocyanates; anhydrides; fluorocarbons; silanes; alkyls; alkenes; aromatics; ethers; esters; and amides.
19. The manufacture of claim 13 further comprising the silica aerogel powder encapsulated in a second polymer, different from the first polymer.
20. The manufacture of claim 13 wherein the physical properties of particles of the silica aerogel powder within the first polymer remain substantially unchanged with respect to their unencapsulated state.
21. A method comprising:
encapsulating silica aerogel powder comprising:
providing the silica aerogel powder in a reaction chamber;

supplying a monomer to the reaction chamber;
creating an activated form of the monomer by way of a plasma within the reaction chamber;
associating at least a portion of the activated monomer with the silica aerogel powder; and
repeating the supplying, creating, and associating, and wherein for each successive creating step a duty cycle of plasma is lower than a previous creating step.

22. The method of claim 21 further comprising wherein for an initial creating step the duty cycle of the plasma is 100%.

23. The method of claim 21 further comprising, prior to supplying, creating, associating or repeating:
supplying an inert gas to the reaction chamber; and
creating a plasma within the reaction chamber while supplying the inert gas.

24. The method of claim 21 further comprising, during the associating, mechanically agitating the silica aerogel powder.

25. The method of claim 21 wherein supplying the monomer further comprises supplying at least one monomer comprising a functional group selected from the functional groups consisting of: carboxylic acids; carboxylates; amines; alcohols; thiols; acid chlorides; halides; epoxides; isocyanates; anhydrides; fluorocarbons; silanes; alkyls; alkenes; aromatics; ethers; esters; and amides.

26. The method of claim 21 further comprising cross-linking at least a portion of the monomers associated with the aerogel powder.

* * * * *